May 18, 1954     K. F. WITT     2,678,669
MACHINE FOR MOLDING WOOD HEELS AND OTHER SIMILAR OBJECTS
Filed Feb. 16, 1951     6 Sheets-Sheet 1

Fig. 1

INVENTOR.
KENNETH F. WITT.
BY Chas. T. Hawley
ATTY.

May 18, 1954. K. F. WITT 2,678,669
MACHINE FOR MOLDING WOOD HEELS AND OTHER SIMILAR OBJECTS
Filed Feb. 16, 1951 6 Sheets-Sheet 2

INVENTOR.
KENNETH F. WITT.
BY
Chas. T. Hawley
ATTY.

May 18, 1954          K. F. WITT          2,678,669

MACHINE FOR MOLDING WOOD HEELS AND OTHER SIMILAR OBJECTS

Filed Feb. 16, 1951          6 Sheets-Sheet 3

INVENTOR.
KENNETH F. WITT
BY Chas. T. Hawley
ATTY.

May 18, 1954     K. F. WITT     2,678,669
MACHINE FOR MOLDING WOOD HEELS AND OTHER SIMILAR OBJECTS
Filed Feb. 16, 1951     6 Sheets-Sheet 6

*INVENTOR.*
KENNETH F. WITT.
BY Chas. T. Hawley
ATTY.

Patented May 18, 1954

2,678,669

UNITED STATES PATENT OFFICE 2,678,669

MACHINE FOR MOLDING WOOD HEELS AND OTHER SIMILAR OBJECTS

Kenneth F. Witt, Winchendon, Mass., assignor to Goodspeed Machine Company, Winchendon, Mass., a corporation of Massachusetts Application February 16, 1951, Serial No. 211,349

4 Claims. (Cl. 144—144)

This invention relates to a machine which is particularly designed for producing wood heels from roughed-out heel blanks. In such machines, two molding cutters are commonly rotated in opposite directions on adjacent vertical spindles, and the wood heel blank is successively presented to the two molding cutters and is partially rotated while in contact with each cutter.

It is the general object of my invention to provide a machine in which a blank will be clamped, molded, unclamped and ejected, all in a continuous series of automatic operations.

A further object of my invention is to provide safety devices by which the machine may be returned to starting position at any point in the automatic operation thereof, and by which the initiation of the automatic operation is made dependent on the presence of a blank in the machine at the time when the starting switch is closed.

My invention further relates to arrangements and combinations of parts which will be hereinafter described and more particularly pointed out in the appended claims.

A preferred form of the invention is shown in the drawings, in which.

General statement of operation

The operation of my improved machine may be briefly stated as follows:

A heel blank is manually placed on the work support, and while so held against a positioning gauge, the machine is manually started in operation.

A plunger first descends on the blank and clamps the blank to the work support, while at the same time impressing a size or other number on the blank.

As the blank is clamped, a positioning gauge is removed to a non-interfering position and the work support is moved to the left and also rearward to cause a form or pattern mounted on the work support to engage a gauging surface or disc mounted on the bearing of the left-hand cutter spindle. The cutter and spindle rotate continuously.

The work support is then partially rotated counterclockwise and the blank is trimmed to the shape indicated by the pattern, which is fixed to the work support and rotates therewith.

As soon as the cut reaches the middle of the rear face of the heel, the work support is momentarily kicked out or forward and is simultaneously shifted transversely to the right to engage the former or pattern with the gauging surface on the second or right-hand cutter spindle bearing. The second cutter and spindle also rotate continuously but in the opposite direction. During this transverse movement, the work support returns to its previous rearward position, and during the same transverse movement the work support completes its half-revolution and is in position for the second cutting operation.

The work support and heel blank are then rotated in the reverse or clock-wise direction, thus cutting the remaining rear portion of the heel to the center of the rear face, and at this point the work support is moved forward to its original loading position while the reverse half-rotation is completed. The clamping plunger is then raised to release the blank, and a blast of air is applied to automatically eject the finished heel.

The side gauge returns to gauging position as the plunger is raised, and the machine stops with all parts in position to receive a fresh heel blank.

General description of the machine

Figures 3, 3A:
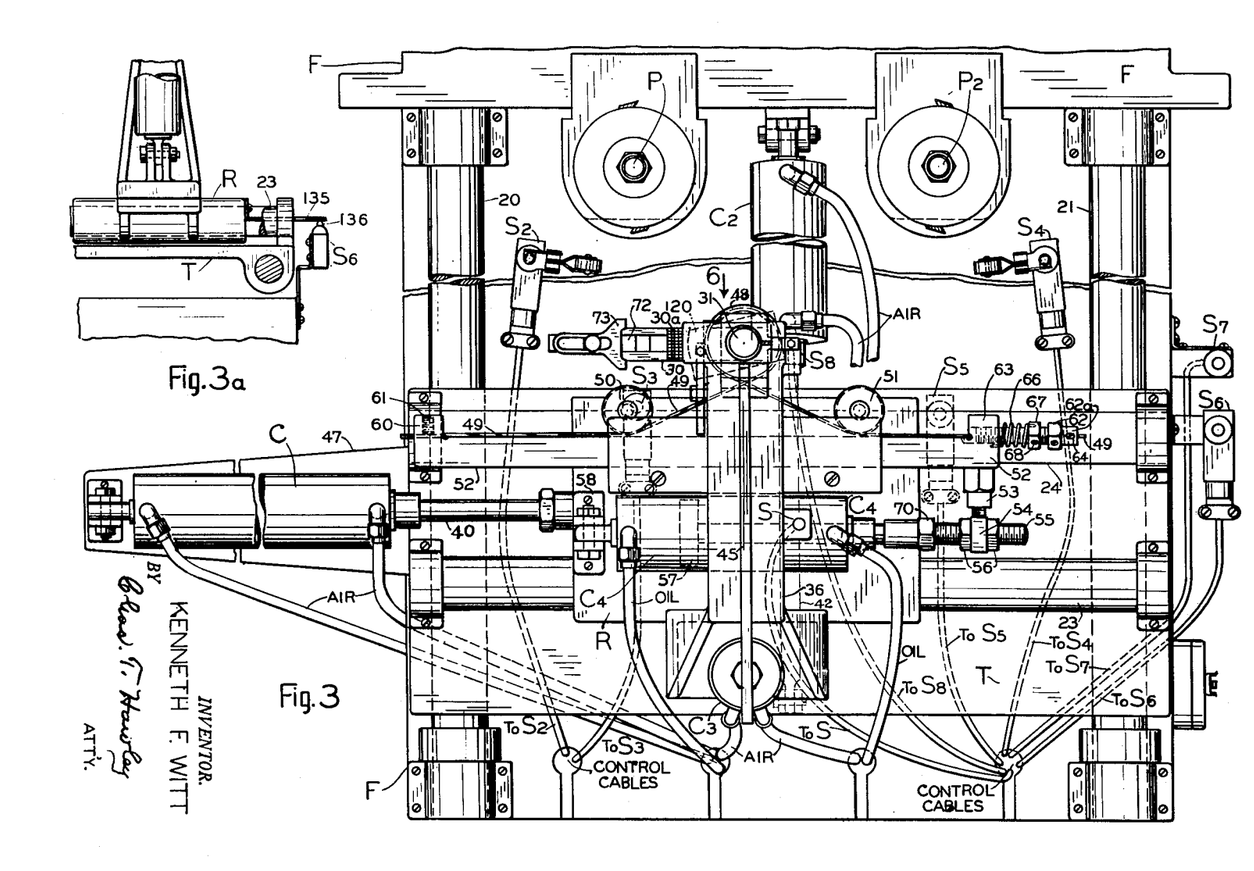
Fig. 3 is a plan view of the machine.
Fig. 3a is a detail front view of a control switch and associated parts.

My improved machine comprises a frame or casing F (Fig. 1) on which a table T is mounted to slide rearward and forward, or towards and away from the center line passing through the two cutter spindles P and P2 (Fig. 3). The table T is shown as mounted to slide on cylindrical end supports or shafts 20 and 21 (Fig. 3) fixed in the upper part of the frame F.

Figure 1:
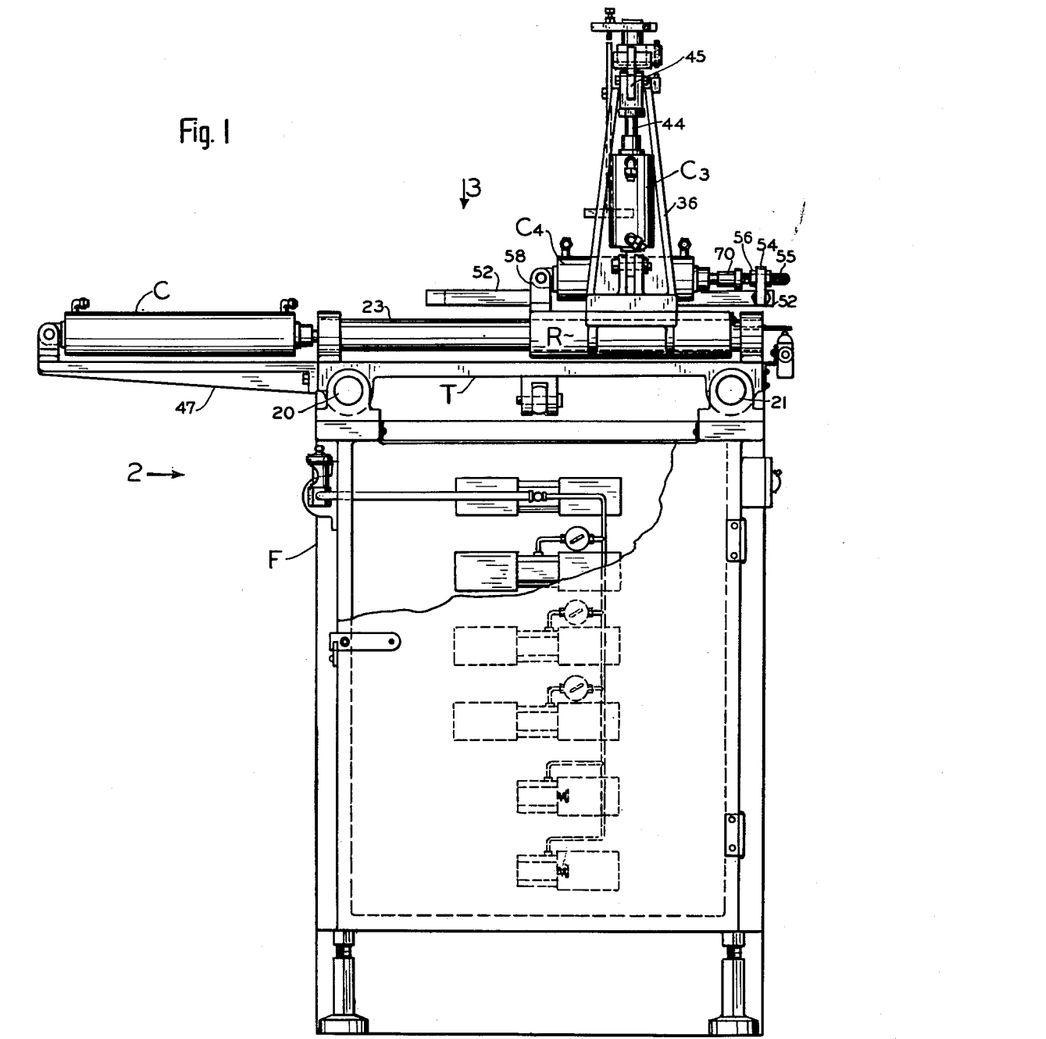
Fig. 1 is a front view of my improved machine.

A carriage R is mounted to slide transversely or to the right and left in Fig. 1 on front and back cylindrical shafts 23 and 24 mounted on the table T. A work support 30 (Fig. 3) is mounted on an upright spindle 31 which is rotatably supported in a bearing 32 in the rear part of the carriage R. A work clamping plunger 35 (Fig. 2) is mounted to slide vertically in an overhanging bracket 36 which is also mounted on and moves with the carriage R.

A transverse air cylinder C (Fig. 4) operates through a piston rod 40 to move the carriage R lengthwise on the supports 23 and 24, and an "in-and-out" cylinder C2 (Figs. 2 and 3) operates through a piston rod 42 to move the table T forward and rearward on the supports 20 and 21. A clamping cylinder C3 (Fig. 2) operates through a piston rod 44 and lever 45 to move the clamping plunger 35 downward and upward.

The transverse cylinder C (Fig. 4) is mounted on an extension 47 at the end of the table T. The "in-and-out" cylinder C2 (Fig. 2) is located below the table T and is pivotally secured to the fixed frame F. The clamping cylinder C3 is mounted in the bracket 36 fixed to the carriage R and previously described.

Work rotating means

The work supporting spindle 31 (Figs. 2 and 6) has a spirally grooved drum 48 on which a cable 49 makes about two turns. The cord 49 then engages grooved guide-rolls 50 and 51 (Figs. 3 and 6) mounted on the rear part of the carriage R, and the ends of the cord are then secured to the outer ends of a bar 52 mounted to slide lengthwise through a guideway on the carriage R.

At its right-hand end, the bar 52 has an offset stud 53 (Figs. 3 and 4) projecting forward and having a collar 54 in which a threaded piston rod 55 may be adjustably secured by nuts 56. The piston rod 55 is connected to a piston 57 (Fig. 3) slidable in a cylinder C4 pivoted at its left-hand end to a bracket 58 on the carriage R.

While the cylinders C, C2 and C3 are air-operated, the cylinder C4 is oil or liquid operated for a reason to be described.

As oil is admitted to one end or the other of the cylinder C4, the bar 52 will be moved lengthwise and the cord 49 will correspondingly rotate the spindle 31 and the work support 30 mounted thereon. The guide pulleys 50 and 51 have limited free vertical movement on their supporting studs to permit the opposite ends of the cord 49 to rise or drop as the cord is wound and unwound on the drum 48.

At the left-hand end of the bar 52, the cord 49 (Fig. 3) extends through a hole in a projection 60 (Fig. 3) and may be secured therein by a set-screw 61. At the right-hand end of the bar 52, the cord 49 extends through axial openings in a stud 62 and in a collar 62a which abuts the stud 62. The stud 62 is threaded in a lug or projection 63 on the bar 52.

The cord is secured in the collar 62a by a set-screw 64 and may be tightened by screwing the stud 62 in or out with respect to the lug or projection 63. A relatively stiff coil spring 66 is loosely mounted on the stud 62 and has one end seated in the adjacent end of the bar 52, and the other end of the spring is seated in a nut 67 threaded on the stud 62 and having a set-screw 68.

The stud 62 is turned to give the desired tension to the cord 49, and the nut 67 is then adjusted to place a desired tension on the spring 66. The set-screw 68 is then tightened to lock the nut 67 to the stud 62. If the cord 49 thereafter tends to loosen or become slack during machine operation, the spring 66 will immediately rotate the nut 67 and stud 62 to take up the slack, and will thus automatically maintain the desired cord tension.

A nut 70 (Fig. 3) is threaded on the piston rod 55 and may be adjusted to limit the travel of the piston rod 55 to the left relative to the casing or cylinder C4 as shown in Fig. 3.

Work support

The work support 30 (Fig. 6) has a roughened upper surface 30a to engage a heel blank B and has an outward extension 72 which adjustably receives a gauge block 73 which determine the lengthwise position of the heel blank B.

In its lower portion, the work support 30 is longitudinally grooved at each side to receive a U-shaped pattern or former 75 (Fig. 6a) which determines the configuration of the finished heel, as will be hereinafter described.

Figures 6, 6A:
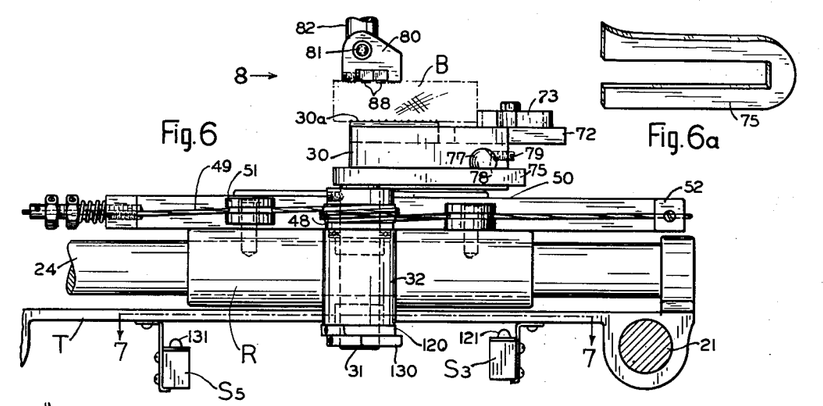
Fig. 6 is a rear elevation of the rotatable work support and certain parts associated therewith, looking in the direction of the arrow 6 in Fig. 3.
Fig. 6a is a plan view of a former or pattern.

A flattened cross rod 77 (Fig. 6) extends through a transverse recess in the support 30 and has an inclined surface 78 positioned for engagement by a set-screw 79. The former or pattern 75 may be firmly clamped in position by advancing the set-screw 79 against the rod 77 as shown in Fig. 6.

Figure 8:
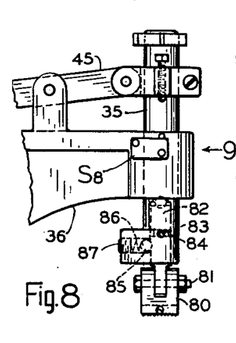
Fig. 8 is a side elevation of the work clamping device, looking in the direction of the arrow 8 in Fig. 9.

A clamping member 80 (Figs. 6 and 8) is pivoted at 81 to a stud 82 swivelled in the lower end of the plunger 35 and held from axial displacement by a screw or pinion 83 extending into a groove 84 (Fig. 8). The stud 82 is recessed to seat a ball 85 mounted in the lower end of the plunger 35 and the ball is yieldingly held in the recess by a spring 86 secured by a screw 87. A ball 87a acts as a thrust bearing for the stud 82. The clamping member 80 is thus yieldingly rotatable relative to the plunger 35 but will be returned to the position shown in Fig. 6 whenever released. The clamping member 80 will then be in its initial angular position.

Figures 9, 10, 11:
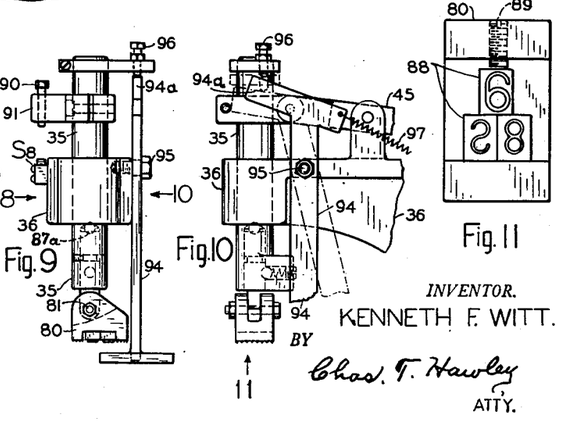
Fig. 9 is a rear elevation thereof, looking in the direction of the arrow 9 in Fig. 8.
Fig. 10 is a view similar to Fig. 8 but looking from the opposite side, looking in the direction of the arrow 10 in Fig. 9.
Fig. 11 is a detail bottom view, looking in the direction of the arrow 11 in Fig. 10.

Die blocks 88 (Figs. 6 and 11) may be secured in the lower face of the member 80 by one or more set-screws 89, and these dies will impress a size or number in the upper surface of the blank B as the clamping member 80 is tightened against the blank.

The lowered position of the plunger 35 is ordinarily determined by engagement of the member 80 with the blank B. Should the machine be started with no blank in position, however, a stop screw 90 (Figs. 8 and 9) threaded in a lateral extension of a collar 91 on the plunger 35 will engage a safety switch S8 on the end of the fixed bracket 36. This closes a safety circuit to be described and also prevents the die blocks 88 from engaging the upper surface 30a on the work support 30.

A side gauge bar 94 (Figs. 2, 9 and 10) is pivoted at 95 to the bracket 36 and has an offset upper end portion 94a positioned for engagement by an adjustable screw or stud 96 as the plunger 35 moves downward. A spring 97 (Fig. 10) normally moves the gauge bar 94 to the position shown in Fig. 9 and also in full lines in Fig. 10.

The gauge bar 94 positions the heel blank B sidewise, while the gauge block 73 (Fig. 6) positions the blank endwise. As the plunger 35 moves downward to clamping position, the stud 96 engages the offset portion 94a of the gauge bar 94 and swings it to the position shown in broken lines in Fig. 10, in which position it does not interfere with the further operation of the machine. As soon as the plunger 35 is raised to release the molded heel, the gauge bar 94 returns to its initial and operative position.

Fluid pressure system

Figure 4:
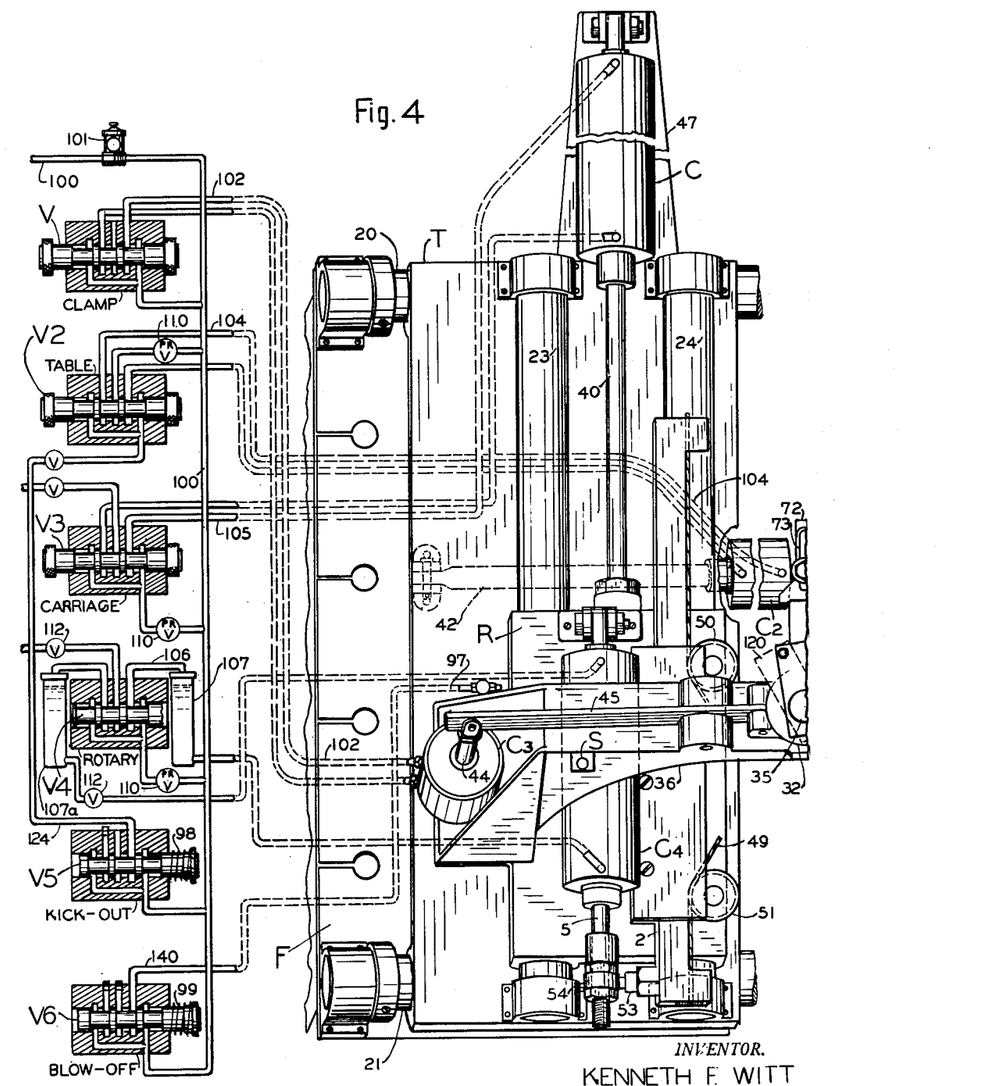
Fig. 4 is a diagrammatic view, partly in section and partly in perspective, and particularly showing the operating cylinders and valves and certain parts connected thereto.

Certain details of the valves, cylinders, actuating connections, and other devices in the fluid pressure operating system, are represented diagrammatically in Fig. 4, which shows the cylinder C for moving the carriage R lengthwise of the supports 23 and 24, the cylinder C2 for moving the table T and carriage R rearward and forward or "in and out" on the supports 20 and 21, the cylinder C3 for clamping the heel blank B, and the cylinder C4 for rotating the work support and heel blank (Fig. 6).

Figures 2, 7A:
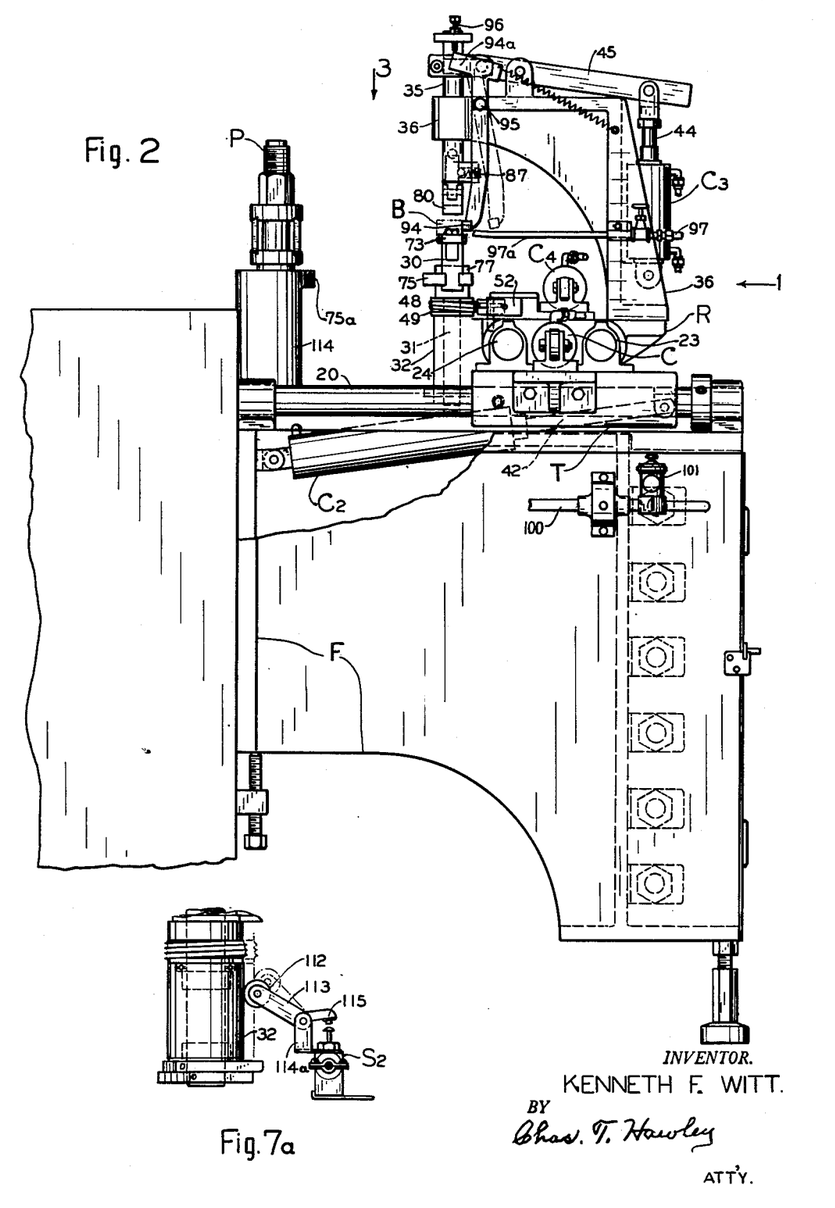
Fig. 2 is a left-hand side elevation thereof.
Fig. 7a is a rear elevation of a control switch, looking in the direction of the arrow 7a in Fig. 7.

Figs. 2 and 4 also show a blow-off pipe 97 and nozzle 97a through which a blast of air may be projected against a finished heel to eject it from the machine.

Figure 5:
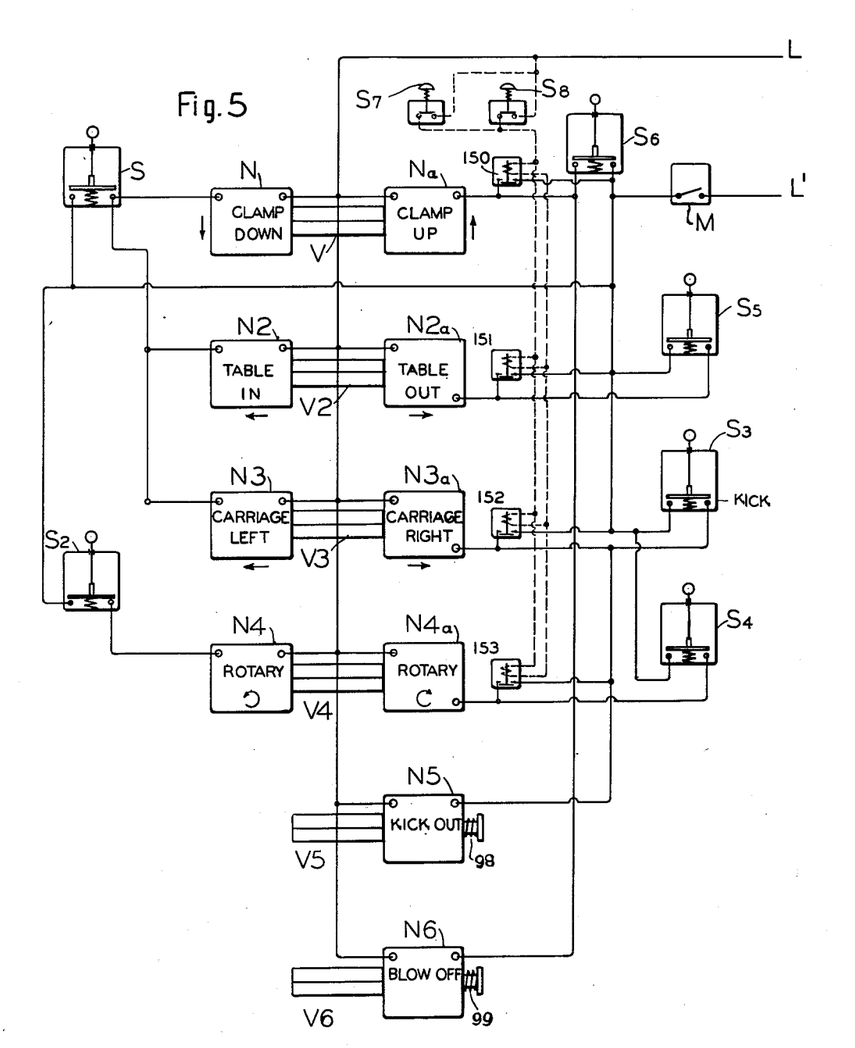
Fig. 5 is a diagrammatic view showing the switches and electrical connections by which the control valves are operated.

The several cylinders and the blow-off pipe 97 are controlled by a series of solenoid-operated valves V, V2, V3, V4, V5 and V6 which are indicated diagrammatically in Fig. 5 and which are shown in section in Fig. 4.

Air under pressure is supplied to the system through a feed pipe 100 (Fig. 4) having a lubricator or oil-feed device 101 which supplies enough oil to lubricate the valve pistons. The valves V, V2, V3 and V4 have separate solenoid coils to shift each of these valves in both directions, and these valves will remain in any shifted position until the reverse solenoid is rendered operative. Solenoids N, N2, N3 and N4 (Fig. 5) shift these valves to the left in Fig. 4, and solenoids Na, N2a, N3a and N4a shift them to the right.

The valve V5 has a solenoid N5 to shift it to the left in Fig. 5, and the valve is returned to initial position by a spring 98. The valve V6 is similarly shifted to the left by a solenoid N6 (Fig. 5) and is returned by a spring 99.

Sequence of operation

The parts are shown in Fig. 4 in starting position, with air from the supply pipe 100 flowing through the valve V and pipe 102 to the upper end of the cylinder C3, thus holding the clamping piston down and the clamping plunger 35 raised. Air also flows from the pipe 100 through the valve V2 and pipe 104 to the rear end of the cylinder C2, thus holding the table T in its forward position. Air supplied through the valve V3 and pipe 105 applies pressure in the outer end of the cylinder C and thus holds the carriage R in its right-hand position. Air supplied through the valve V4 and pipe 106 acts on the liquid surface in a tank cylinder 107, thus providing oil pressure in the right-hand end of the cylinder C4. Corresponding but inactive connections are also provided to the opposite ends of each of the described cylinders.

The valves V5 and V6 are normally closed and the operation thereof will be hereinafter described. Pressure regulating or reducing valves 110 are supplied in the feed pipes connected to the valves V2, V3 and V4, so that these valves are operated by reduced and regulated pressure.

Oil is used in the cylinder C4 to rotate the work support at constant and predetermined speed and to prevent chatter-marks in the finished surface. The speed is controlled by a valve 112 (Fig. 4).

Electrical control

The valves and their solenoids are indicated diagrammatically in Fig. 5, along with a series of switches S to S8, and the switches and solenoids are inter-connected as shown. Current is supplied from lines L and L', and a main switch M is provided in line L'. All switches are normally open. When the machine is to be started, the main switch M is closed and a hand-operated starting switch S (Figs. 3, 4 and 5) is then momentarily closed. This completes a circuit from the line wire L' (Fig. 5) through the switch S and solenoid N to the line wire L, and also through the solenoids N2 and N3 which are mounted in parallel with the solenoid N.

The solenoid N shifts the valve V (Fig. 4) to the right to reverse the pressure in the cylinder C3 and to thus operate the clamping lever 45 to move the plunger 35 and clamping member 80 down against the heel blank B. At the same time the solenoid N2 shifts the valve V2 to the right in Fig. 4, thus supplying pressure to move the table T rearward, and the solenoid N3 simultaneously shifts the valve V3 to the right, applying pressure to move the carriage R to the left as viewed in Fig. 3.

As the table T moves rearward, the former or pattern 75 engages a gauging surface 75a (Fig. 2) on a fixed bearing 114 of the left-hand cutter spindle P, and thus gauges the depth of the cut into the side of the heel blank B.

The carriage R and heel blank support 30 continue to move to the left in Fig. 3, and the adjacent side of the blank B is thus molded until the work-support reaches its extreme left-hand position.

When the carriage R approaches this point in the operation, the side of the work-support spindle bearing 32 (Fig. 7a) engages a roll 112 on a lever 113 pivoted on a fixed bracket 114a. The lever 113 has an arm 115 positioned to engage and close a limit-switch S2 (Fig. 5) when thus engaged.

This closing of the switch S2 completes the circuit of the solenoid N4 and shifts the valve V4 to the right in Fig. 4, thus applying pressure to the oil in the left-hand oil cylinder 107a. This in turn reverses the pressure on the piston 57 in the cylinder C4 and moves the piston 57, the piston rod 55 and the bar 52 to the right in Fig. 3, thus rotating the work support 30, the former 75 and the heel blank B counter-clockwise, as viewed in Fig. 3, and molding the segmental rear end of the heel blank to the rear center line.

Figure 7:
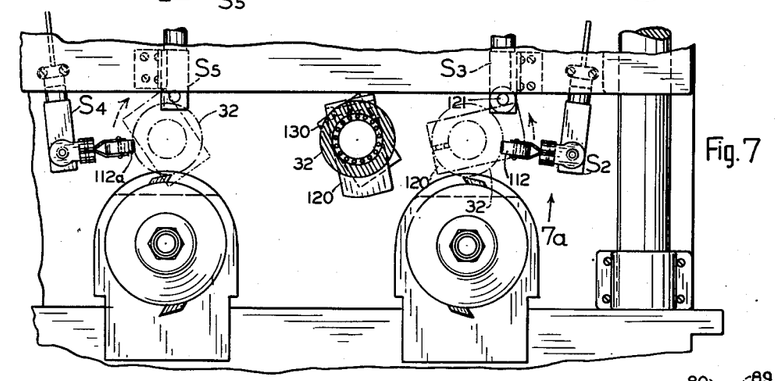
Fig. 7 is a partial sectional plan view, showing the rotating work support and certain parts engaged thereby, and taken along the line 7—7 in Fig. 6.

In order to prevent cutting against the grain, the cut must be stopped at the center line, and this is accomplished in the following manner:

An arm 120 (Figs. 6 and 7) is secured to the lower end of the work-support spindle 31 in angularly adjusted position and, as the heel blank completes a 90° movement with the work-support spindle 31 in the position shown at the right in the bottom view of Fig. 7, the arm 120 engages a stud or projection 121 and closes a micro-switch S3 (Fig. 5).

The closing of this switch S3 has two effects. In the first place, it completes the operating circuit through the solenoid N5 and thus shifts the valve V5 to the left in Fig. 4. This admits full air pressure through the pipe 124 into the left-hand side of the valve V2 which is at that time the exhaust side. This full air pressure momentarily overcomes the regulated air pressure in the front end of the cylinder C2 and thus kicks the table T out or forward enough so that the heel blank B clears the cutter.

At the same time, the closing of the switch S3 completes the circuit through the solenoid N3a (Fig. 5) to shift the valve V3 to the left, thus returning it to the original position shown in Fig. 4. This causes the carriage R to be shifted to the right and carries the heel support 30 and heel blank B into the range of operation of the second cutter on the right-hand spindle P2 (Fig. 3).

As soon as the carriage R starts to move to the left as viewed in Fig. 6, the arm 120 clears the stud 121 and the switch S3 opens, thus breaking the circuit on the solenoid N5 and permitting the spring 98 (Fig. 4) to return the valve V5 to the inoperative position shown in Fig. 5. The carriage R then returns to its original rearward position as determined by the former 75 and under the influence of the regulated pressure in the front end of the cylinder C2. The table T continues its movement to the right in Fig. 3 and during this movement the second cutter, which is reversely rotated, molds the second side of the blank B. During this movement of the table T to the left in Fig. 6, the cylinder C4 continues to rotate the work support and heel blank in its anti-clockwise direction so that a full half-rotation (180°) is completed before the second cut begins.

As the table T reaches its extreme right-hand position, the side of the work support spindle bearing 32 engages a roll 112a (Fig. 7) which controls the operation of the switch S4 (Fig. 5) and closes the same to complete a circuit through the solenoid N4a. This shifts the valve V4 to the right in Fig. 4, admitting pressure on the oil in the right-hand oil cylinder 107 which, in turn, provides oil pressure at the left-hand end of the cylinder C4 and thus rotates the work support clockwise through the cord connections previously described.

Upon completion of a 90° rotation and with the cutter again at the rear center line of the heel, an arm 130 (Figs. 6 and 7) on the work spindle 31 engages a stud 131 and closes a switch S5 (Fig. 5). This energizes the solenoid N2a and returns the valve V2 (Fig. 4) to initial position, thus applying pressure to the rear end of the cylinder C2 and moving the table T forward to its starting position. During this forward movement, the reverse half-rotation of the work-support is completed.

As the forward or starting position is approached, an arm 135 (Fig. 3a) engages a stud 136 and closes a switch S6 (Fig. 5). The closing of the switch S6 completes a circuit through the solenoid Na and thus returns the valve V to the position shown in Fig. 4. This raises the clamping plunger 35 and the clamping member 80.

At the same time, a circuit is closed through the solenoid N6, thus shifting the valve V6 (Fig. 4) to the left and admitting a strong blast of air through the pipe 140 to the blow-off pipe 97 which is connected to the nozzle 97a (Fig. 2). This blows the finished and molded heel out of the machine as soon as it is unclamped, thus unloading the machine.

The arm 135 (Fig. 3a) moves off the stud 136 as the carriage R approaches its initial forward position and thus allows the spring 99 (Fig. 4) to close the blow-off valve V6. All parts are now in their original positions, and all parts remain at rest until a new blank has been inserted and the switch S is again closed.

*Safety and return circuits*

Special provision is made for returning the machine to starting position at any time when this appears desirable, as, for instance, when a heel blank proves defective. For this purpose, a manually-operated switch S7 (Figs. 3 and 5) is provided, which controls a circuit through a plurality of parallel relay switches 150, 151, 152 and 153 (Fig. 5). These switches are located in by-pass connections to the solenoids Na, N2a, N3a and N4a. When the switch S7 is manually closed, these solenoids Na to N4a promptly return all valves of the machine to starting position. It is thus possible to stop the operation of the machine at any desired point should emergency occur.

A second safety switch S8 (Figs. 5 and 8) is mounted on the bracket 36 adjacent the clamping plunger 35, and is closed by the stud 90 if the plunger 35 descends with no blank in the machine. The switch S8 is in parallel with the switch S7, as shown in Fig. 5, and the closing of the switch S8 acts through the switches 150 to 153 to energize the solenoids Na to N4a, as previously described, thus restoring the machine to initial or starting condition.

*Summary*

It will thus appear that I have provided an automatic machine for molding wood heels or other similar objects, and that the machine is so constructed that the operator merely has to place a heel blank on the work support and then close the starting switch S. The machine thereafter presents the blank successively to the cutters on the spindles P and P2 and gives the blank successive quarter-revolutions while engaged by the rapidly rotating cutters.

The machine then returns the molded heel to forward position, raises the clamp, and ejects the heel from the machine by directing a strong blast of air against the heel. The machine then stops with all parts in starting position.

Provision is also made as above described for returning the machine to starting position if any emergency arises, or if an attempt is made to start the machine with no blank on the work support.

The machine is simply and reliably constructed and has been found very satisfactory in actual use.

Having thus described my invention and the advantages thereof, I do not wish to be limited to the details herein disclosed, otherwise than as set forth in the claims, but what I claim is:

1. In a machine for molding articles of wood and having a cutter mounted on a vertical spindle rotating in a fixed bearing, in combination, a work-support rotatable about a vertical axis in a bearing member which is mounted for translative movement in a horizontal plane, a pattern mounted to rotate with said work-support and engageable with a fixed reference surface on said spindle bearing, means to present said pattern to said reference surface, means to partially rotate said pattern while in yielding contact with said reference surface, and power means effective to automatically jerk said pattern away from said reference surface at a predetermined point in the rotation of said pattern and work-support.

2. In a machine for molding articles of wood and having a cutter mounted on a vertical spindle rotating in a fixed bearing, in combination, a work-support rotatable about a vertical axis in a bearing member which is mounted for translative movement in a horizontal plane, a pattern mounted to rotate with said work-support and engageable with a fixed reference surface on said spindle bearing, means to present said pattern to said reference surface, means to partially rotate said pattern while in yielding contact with said reference surface, and power means effective to automatically jerk said pattern away from said reference surface at a predetermined point in the rotation of said pattern and work-support, and the means to rotate the work-support comprising a drum on the work-support, a cord encircling said drum, a bar to which the ends of said cord are secured, an oil-operated cylinder and piston to reciprocate said bar, and automatic means to apply said oil pressure in opposite directions at predetermined points in the operative cycle of the machine.

3. In a machine for molding articles of wood and having a cutter mounted on a vertical spindle rotating in a fixed bearing, in combination, a work-support rotatable about a vertical axis in a bearing member which is mounted for translative movement in a horizontal plane, a pattern mounted to rotate with said work-support and engageable with a fixed reference surface on said spindle bearing, means to present said pattern to said reference surface, means to partially rotate said pattern while in yielding contact with said reference surface, and power means effective to automatically jerk said pattern away from said reference surface at a predetermined point in the rotation of said pattern and work-support, and the means to rotate the work-support comprising a drum on the work-support, a cord encircling said drum, a bar to which the ends of said cord are secured, an oil-operated cylinder and piston to reciprocate said bar, storage tanks for said oil connected to each end of said cylinder, means to apply air pressure in a selected tank, and automatically-operated valves controlling the application of such air pressure.

4. A machine for molding articles of wood which comprises cutters mounted to rotate on spaced parallel spindles and in opposite directions, a rotatably mounted work-support, a first power means effective to rotate said work-support, a second power means effective to move said support in a direction parallel to the common plane of said spindle axes, a third power means effective to move said work support toward and from said common plane, automatic devices effective to coordinate the successive operations of said different power means in a predetermined work cycle, and safety means which is dependent on the absence or presence of a workpiece on the work support and which is effective to automatically return the machine to starting position if there is no workpiece on the work support.

References Cited in the file of this patent

UNITED STATES PATENTS

| Number | Name | Date |
| --- | --- | --- |
| 15,429 | McMurtry | July 29, 1856 |
| 1,102,310 | Winkley | July 7, 1914 |
| 1,476,188 | Shaw | Dec. 4, 1923 |
| 1,564,522 | Burke et al. | Dec. 8, 1925 |
| 1,619,154 | Pollard | Mar. 1, 1927 |
| 1,748,994 | Raymond | Mar. 4, 1930 |
| 1,879,388 | Mershon | Sept. 27, 1932 |
| 1,984,453 | Bates et al. | Dec. 18, 1934 |
| 2,071,433 | Russ | Feb. 23, 1937 |
| 2,076,123 | Gialdini | Apr. 6, 1937 |
| 2,090,024 | Bradbury | Aug. 17, 1937 |
| 2,107,578 | Onsrud | Feb. 8, 1938 |
| 2,251,135 | Iknayan | July 29, 1941 |
| 2,405,941 | Clausing | Aug. 20, 1946 |
| 2,426,487 | Clausing | Aug. 26, 1947 |